Oct. 20, 1925.
J. G. BLUNT
1,557,968
JOURNAL BOX FOR RAILROAD VEHICLES
Original Filed Sept. 18, 1923
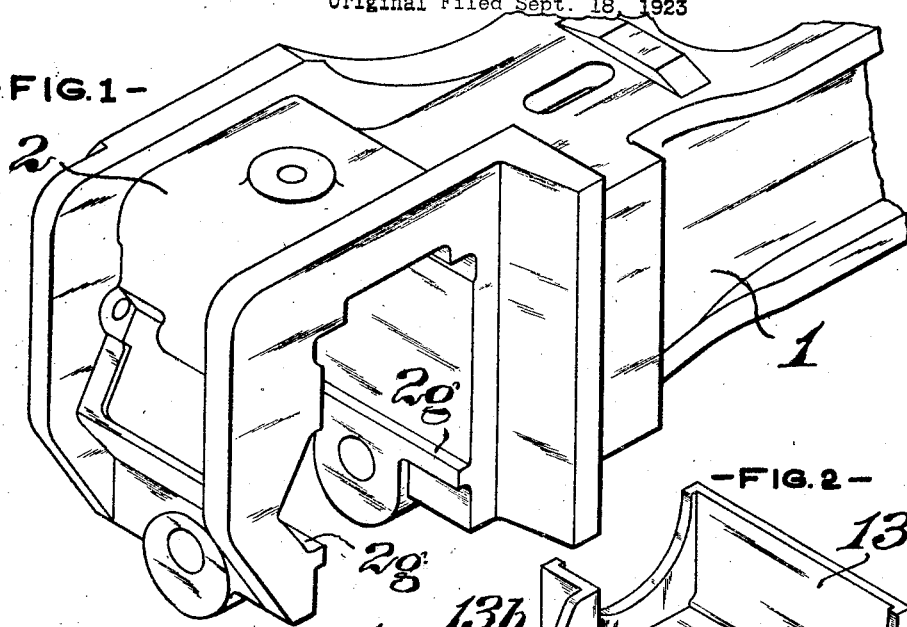
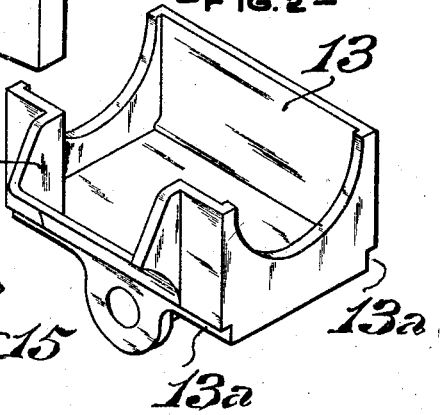
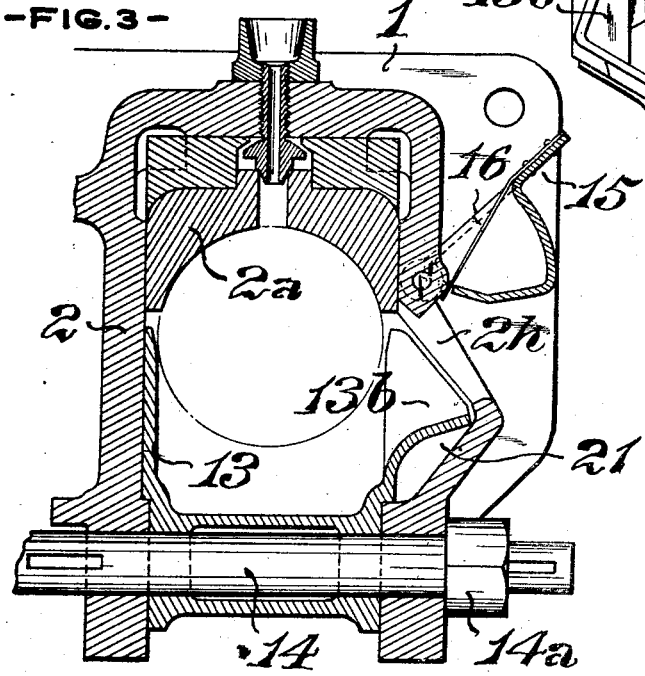

Patented Oct. 20, 1925.

1,557,968

UNITED STATES PATENT OFFICE.

JAMES G. BLUNT, OF SCHENECTADY, NEW YORK.

JOURNAL BOX FOR RAILROAD VEHICLES.

Original application filed September 18, 1923, Serial No. 663,355. Divided and this application filed September 25, 1924. Serial No. 739,795.

*To all whom it may concern:*

Be it known that I, JAMES G. BLUNT, a citizen of the United States, residing at Schenectady, in the county of Schenectady and State of New York, have invented a certain new and useful Improvement in Journal Boxes for Railroad Vehicles, of which improvement the following is a specification.

This invention constitutes a division of my application Serial No. 663,355, filed September 18, 1923, and now Patent No. 1,512,576, dated October 21, 1924.

The object of my invention is to provide a journal box of such construction as to enable it to be readily oiled and packed, without necessitating the removal of the lubricant container from the journal box, which is usual in present practice.

The improvement claimed is hereinafter fully set forth.

In the accompanying drawings: Figure 1 is a view, in perspective, of a journal box, embodying my invention, and the adjoining portion of a connected truck side frame member; Fig. 2, a view, in perspective, of a lubricant cellar, detached; and, Fig. 3, a vertical transverse section through the journal box.

The operation of locomotives in high speed service requires that the lubricant for their truck journals shall be renewed at the end of each trip, and with lubricant containers, or so called truck box cellars, of existing design, this is a difficult and expensive operation, as the cellars must be removed for repacking, and their location is often difficultly accessible. In the use of the construction of my invention, the operation is simplified by the provision of means for supplying the lubricant through openings in the journal boxes, thereby obviating the necessity of removing the cellar.

In the practice of my invention, referring descriptively to the specific embodiment thereof which is herein exemplified, the journal box, 2, is herein shown as formed integral with a side frame member 1, of a railroad vehicle. A journal bearing or brass 2ª, is fitted in the journal box, substantially as in present standard practice.

A lubricant cellar, 13, is located in the usual lower end position in the journal box, and is held in place by a transverse bolt, 14, and nut 14ª. The lubricant cellar is applied to the journal box, from the inner side thereof, and is slid into place on guides, 2ᵍ, on the journal box, which fit under longitudinal recesses, 13ª, on the cellar. Lubricant is supplied to the cellar through an opening, 2ʰ, on one side of the journal box, facing the end of the frame member, which opening is closed by a hinged door, 15, normally maintained in closed position, by a spring, 16, as in journal box lids commonly applied in the journal boxes of freight cars. A mouth, 13ᵇ, formed on the lubricant cellar, projects into a swell or pocket, 2ⁱ, on the open side of the journal box, which swell is suitably recessed to receive it.

It will be seen that the application and removal of the lubricant cellar, as may, from time to time, be desired, can be effected with the same facility as in ordinary practice, and the maintenance in operative service position be equally well assured. The substantial advantage resultant upon the capacity of oiling and packing the cellar without removing it from the journal box, will be apparent to those familiar with the operation of railroad vehicles.

I claim as my invention and desire to secure by Letters Patent:

1. In a journal box for railroad vehicles, the combination with guides on the inside of the box legs, of a lubricant cellar supported on said guides, a feed spout on one side of said cellar, one of the box legs having a feed opening opposite said spout, and a lid for said opening.

2. In a journal box for railroad vehicles, the combination with guides on the inside of the box legs, of a lubricant cellar supported on said guides, a feed spout on one side of said cellar, one of said legs having a swell or pocket to receive said spout, said leg having a feed opening in said swell or pocket, a cover for said opening, and means to removably retain said cellar on said guides.

3. In a truck for railroad vehicles, the combination of a journal box, having a laterally projecting swell or pocket, provided with a supply opening; a lubricant cellar, fitting in said journal box, and having a lateral mouth extending into said swell or pocket; and a hinged door closing the opening of said swell or pocket.

JAMES G. BLUNT.